Patented Sept. 7, 1948

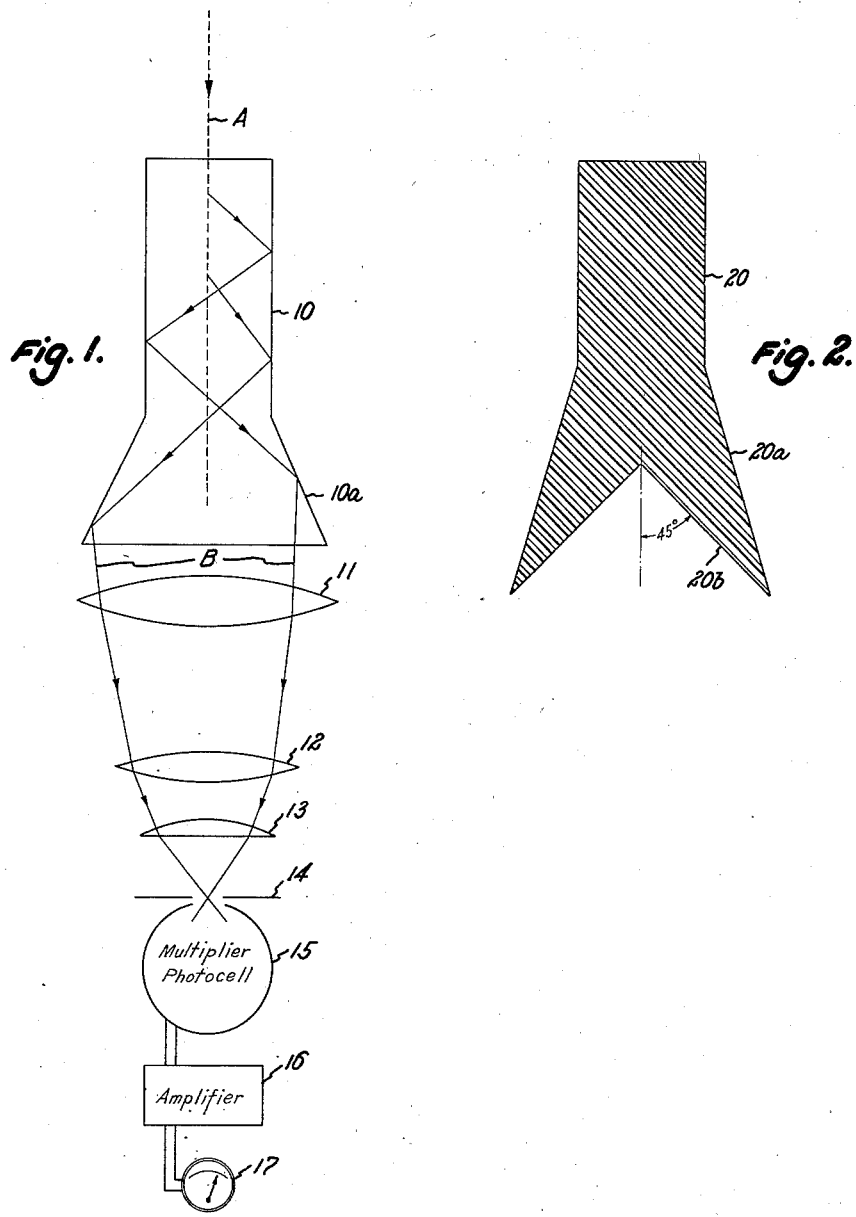

2,448,963

UNITED STATES PATENT OFFICE 2,448,963

DETECTION OF HIGH-SPEED CHARGED PARTICLES

Robert H. Dicke, Princeton, N. J.

Application May 19, 1947, Serial No. 749,109

2 Claims. (Cl. 250—83.3)

This invention relates to apparatus for the detection of high speed charged particles and particularly to apparatus for detecting high speed charged particles by means of the radiation excited by charged particles traveling at high speed through transparent solids.

It has been previously found that when a charged particle, such as an electron, traveling at a high speed approaching the speed of light, passes through a medium in which the phase velocity of the light is less than the velocity of the particle, visible radiation is emitted. This radiation is known as Cerenkov radiation, after the first observer. Phys. Rev. 52,378 (1937). The radiation is propagated in a direction determined by the velocity of the particle and the index of refraction of the medium.

An object of the present invention is the provision of apparatus for the detection of high speed charged particles by means of the Cerenkov radiation.

The apparatus of the invention is characterized by the use of a cylindrical rod of transparent, optically isotropic, dielectric material, such as glass, methacrylate resin, polystyrene or the like, positioned with its longitudinal axis extending in the direction of travel of the article to be detected and having its end portion remote from the end at which the particle enters the rod flared outwardly into a conical portion. The conical end portion of the rod collimates the rays of light emitted by the particle traversing the rod into a beam which is advantageously focussed upon the aperture of a multiplier photoelectric cell by a suitable lens system. The output of the photocell may be amplified in the conventional manner and used to actuate an impulse register or other indicating or recording device.

For the highest efficiency, the angle $\phi$ of the wall of the conical end portion of the tube with longitudinal axis of the tube is determined by the index or refraction $n$ of the dielectric material and the ratio $\beta$ of the speed of the particle to the speed of light in accordance with the relation $$\cos 2\phi = 1/\beta n$$

The invention will be more particularly described with reference to the accompanying drawing in which:

Fig. 1 is a diagrammatic representation of apparatus embodying the principles of the invention; and Fig. 2 is a sectional elevation of an alternate form of the detector element of the invention.

As shown in Fig. 1, the apparatus comprises a detector element 10, an optical system comprising lens elements 11, 12 and 13, an iris 14, a multiplier photocell 15, an amplifier 16, and an indicator 17.

The detector element 10 comprises a rod of transparent, optically isotropic, dielectric material, such as a methacrylate ester resin, having a conical expanded portion 10a at one end thereof. Typically, the shank of the detector element may be of the order of one inch in diameter and two inches in length expanding at one end at an angle, which for very high speed electrons is of the order of 25°, to a diameter of about two inches.

Cerenkov radiation emitted by a high speed particle traversing the detector longitudinally along path A is substantially collimated into a beam B, which is focussed on the aperture of the photocell 15 by lenses 11, 12, 13. The impulse generated in the photocell by the light beam is amplified in amplifier circuit 16 and indicated on instrument 17, which may conveniently be a conventional impulse register device, such as is used in connection with Geiger-Müller counters. Thus each high speed charged particle traversing the detector element 10 substantially longitudinally results in an impulse which is registered on the indicator.

In the modified form of indicator element 20, shown in Fig. 2, the expanded conical end portion 20a is provided with a 45° conical concavity 20b.

I claim:

1. Apparatus for detecting high speed charged particles comprising a rod of transparent, optically isotropic, dielectric material having a conically expanded end portion, a photocell, means for directing light emitted from the expanded end portion of the rod upon the photocell, and means for registering impulses generated in the photocell.

2. Apparatus for detecting high speed charged particles comprising a rod of transparent, optically isotropic, dielectric material having an end portion conically expanded at an angle to the longitudinal axis of the cell determined by the relation $$\cos 2\phi = 1/\beta n$$

wherein $\phi$ is the angle, $\beta$ is the ratio of the speed of the particle to the speed of light and $n$ is the index of refraction of the dielectric material, a photocell, means for directing light emitted from the expanded end portion of the rod upon the photocell, and means for registering impulses generated in the photocell.

ROBERT H. DICKE.